United States Patent
Alon et al.

(10) Patent No.: US 12,321,045 B2
(45) Date of Patent: Jun. 3, 2025

(54) ELECTRICALLY-TUNABLE VISION AID FOR TREATMENT OF MYOPIA

(71) Applicant: OPTICA AMUKA (A.A.) LTD., Petach Tikva (IL)

(72) Inventors: Alex Alon, Binyamina (IL); Yariv Haddad, Raanana (IL); Yoav Yadin, Ganey Tikva (IL)

(73) Assignee: Optica Amuka (A.A.) Ltd, Petach Tikva (IL)

( * ) Notice: Subject to any disclaimer, the term of this patent is extended or adjusted under 35 U.S.C. 154(b) by 672 days.

(21) Appl. No.: 17/612,226

(22) PCT Filed: May 13, 2020

(86) PCT No.: PCT/IB2020/054524
§ 371 (c)(1),
(2) Date: Nov. 18, 2021

(87) PCT Pub. No.: WO2020/245680
PCT Pub. Date: Dec. 10, 2020

(65) Prior Publication Data
US 2022/0214566 A1    Jul. 7, 2022

Related U.S. Application Data

(60) Provisional application No. 62/856,065, filed on Jun. 2, 2019.

(51) Int. Cl.
*G02C 7/00*        (2006.01)
*G02B 13/14*       (2006.01)
(Continued)

(52) U.S. Cl.
CPC .............. *G02C 7/083* (2013.01); *G02B 13/14* (2013.01); *G02B 27/0093* (2013.01);
(Continued)

(58) Field of Classification Search
CPC ........ G02B 13/14; G02B 13/08; G02B 26/06; G02B 27/0093; G02B 27/286;
(Continued)

(56) References Cited

U.S. PATENT DOCUMENTS 3,580,661 A    5/1971  Cooper, Jr. et al.
3,881,921 A    5/1975  Frank
(Continued)

FOREIGN PATENT DOCUMENTS

CN    101246265 A    8/2008
CN    201752480 U    3/2011
(Continued)

OTHER PUBLICATIONS

International Application # PCT/IB2020/054524 Search Report dated Aug. 31, 2020.
(Continued)

*Primary Examiner* — Mahidere S Sahle
(74) *Attorney, Agent, or Firm* — Meitar Patents Ltd.; Daniel Kligler (57) ABSTRACT

Apparatus for vision correction includes an electrically-tunable optical phase modulator (42, 44), which is configured to be mounted in proximity to an eye of a subject. Control circuitry (26) is configured to apply drive signals to the optical phase modulator so as to generate in the optical phase modulator a first phase modulation profile in a central zone (37) that intercepts a line of sight (32) of the eye and a second phase modulation profile, different from the first phase modulation profile, in a peripheral zone (39) extending peripherally around the central zone over at least 180° of arc. The first phase modulation profile is selected so as to enable clear vision by the eye in the central zone, while the second phase modulation profile is selected so as to blur light that is incident on the eye through the peripheral zone.

27 Claims, 5 Drawing Sheets

(51) Int. Cl.
*G02B 27/00* (2006.01)
*G02B 27/28* (2006.01)
*G02C 7/02* (2006.01)
*G02C 7/06* (2006.01)
*G02C 7/08* (2006.01)
*G02F 1/29* (2006.01)
*G02B 13/08* (2006.01)
*G02B 26/06* (2006.01)
*G02F 1/133* (2006.01)

(52) U.S. Cl.
CPC ............. *G02B 27/286* (2013.01); *G02F 1/29* (2013.01); *G02F 1/294* (2021.01); *G02B 13/08* (2013.01); *G02B 26/06* (2013.01); *G02C 2202/16* (2013.01); *G02C 2202/24* (2013.01); *G02F 1/13306* (2013.01)

(58) Field of Classification Search
CPC ............................ G02C 7/083; G02C 2202/16; G02C 2202/24; G02F 1/29; G02F 1/294; G02F 1/13306
USPC ........ 351/159.39, 159.68; 359/245, 315, 316, 359/354, 489.14, 578
See application file for complete search history.

(56) References Cited

U.S. PATENT DOCUMENTS

| | | | |
|---|---|---|---|
| 4,190,330 A | 2/1980 | Berreman et al. |
| 4,300,818 A | 11/1981 | Schachar |
| 4,584,592 A | 4/1986 | Tuan et al. |
| 4,853,764 A | 8/1989 | Sutter |
| 5,073,021 A | 12/1991 | Marron |
| 5,212,583 A | 5/1993 | Vali et al. |
| 5,359,444 A | 10/1994 | Piosenka et al. |
| 5,434,690 A | 7/1995 | Hisatake et al. |
| 5,757,546 A | 5/1998 | Lipton et al. |
| 5,815,233 A | 9/1998 | Morokawa et al. |
| 5,861,936 A | 1/1999 | Sorensen |
| 5,861,940 A | 1/1999 | Robinson et al. |
| 6,104,368 A | 8/2000 | Bonnett et al. |
| 6,152,563 A | 11/2000 | Hutchinson et al. |
| 6,243,063 B1 | 6/2001 | Mayhew et al. |
| 6,369,933 B1 | 4/2002 | O'Callaghan |
| 6,491,394 B1 | 12/2002 | Blum et al. |
| 6,501,443 B1 | 12/2002 | Mcmahon |
| 6,517,203 B1 | 2/2003 | Blum et al. |
| 6,553,504 B1 | 4/2003 | Katzenelson et al. |
| 6,857,741 B2 | 2/2005 | Blum et al. |
| 6,888,661 B1 | 5/2005 | Islam et al. |
| 6,986,579 B2 | 1/2006 | Blum et al. |
| 7,475,984 B2 | 1/2009 | Blum et al. |
| 7,475,985 B2 | 1/2009 | Blum et al. |
| 7,497,121 B2 | 3/2009 | Okuda et al. |
| 7,503,655 B2 | 3/2009 | Smith, III et al. |
| 7,517,083 B2 | 4/2009 | Blum et al. |
| 7,600,872 B2 | 10/2009 | Esser et al. |
| 7,728,949 B2 | 6/2010 | Clarke et al. |
| 8,028,473 B2 | 10/2011 | Galstian et al. |
| 8,052,278 B2 | 11/2011 | Bovet et al. |
| 8,675,148 B2 | 3/2014 | Takagi et al. |
| 8,690,321 B2 | 4/2014 | Lapstun |
| 8,773,629 B2 | 7/2014 | Uehara et al. |
| 8,896,772 B2 | 11/2014 | Fraval et al. |
| 8,922,902 B2 | 12/2014 | Blum et al. |
| 9,052,514 B2 | 6/2015 | Takama |
| 9,241,669 B2 | 1/2016 | Pugh et al. |
| 9,304,319 B2 | 4/2016 | Bar-Zeev et al. |
| 9,459,457 B2 | 10/2016 | Murray et al. |
| 9,541,774 B2 | 1/2017 | Machida et al. |
| 9,958,703 B2 | 5/2018 | Pugh et al. |
| 10,036,901 B2 | 7/2018 | Yadin et al. |
| 10,268,050 B2 | 4/2019 | To et al. |
| 10,288,904 B2 | 5/2019 | Yadin et al. |
| 10,466,391 B2 | 11/2019 | Yadin et al. |
| 11,360,328 B1 | 6/2022 | Yam et al. |
| 2002/0044125 A1 | 4/2002 | Maltese |
| 2003/0058406 A1 | 3/2003 | Blum et al. |
| 2003/0128416 A1 | 7/2003 | Caracci et al. |
| 2003/0210377 A1 | 11/2003 | Blum et al. |
| 2003/0231293 A1 | 12/2003 | Blum et al. |
| 2004/0041745 A1 | 3/2004 | Chen |
| 2004/0156021 A1 | 8/2004 | Blum et al. |
| 2004/0160389 A1 | 8/2004 | Suyama |
| 2004/0169630 A1 | 9/2004 | Ide |
| 2005/0146495 A1 | 7/2005 | Mackinnon et al. |
| 2005/0162367 A1 | 7/2005 | Kobayashi et al. |
| 2005/0168430 A1 | 8/2005 | Nishimura et al. |
| 2005/0264502 A1 | 12/2005 | Sprague et al. |
| 2006/0034003 A1 | 2/2006 | Zalevsky |
| 2006/0066808 A1 | 3/2006 | Blum et al. |
| 2006/0092340 A1 | 5/2006 | Blum et al. |
| 2006/0126698 A1 | 6/2006 | Blum et al. |
| 2006/0164593 A1 | 7/2006 | Peyghambarian et al. |
| 2006/0164687 A1 | 7/2006 | Huang et al. |
| 2007/0013865 A1 | 1/2007 | Jordan |
| 2007/0052876 A1 | 3/2007 | Kaufman et al. |
| 2007/0146873 A1 | 6/2007 | Ortyn et al. |
| 2007/0236769 A1 | 10/2007 | Zalevsky |
| 2007/0236800 A1 | 10/2007 | Cakmakci et al. |
| 2007/0280626 A1 | 12/2007 | Haddock et al. |
| 2007/0290972 A1 | 12/2007 | Meredith |
| 2008/0239420 A1 | 10/2008 | McGrew |
| 2009/0096981 A1 | 4/2009 | Clarke et al. |
| 2009/0103044 A1 | 4/2009 | Duston et al. |
| 2009/0237575 A1 | 9/2009 | Tsi-Shi |
| 2009/0279050 A1 | 11/2009 | McGinn et al. |
| 2010/0007804 A1 | 1/2010 | Guncer |
| 2010/0026920 A1 | 2/2010 | Kim et al. |
| 2010/0149444 A1 | 6/2010 | Hikmet et al. |
| 2010/0157181 A1 | 6/2010 | Takahashi |
| 2011/0018903 A1 | 1/2011 | Lapstun et al. |
| 2011/0037837 A1 | 2/2011 | Chiba et al. |
| 2011/0228181 A1 | 9/2011 | Jeong et al. |
| 2011/0234934 A1 | 9/2011 | Chang |
| 2011/0317128 A1 | 12/2011 | Guilloux et al. |
| 2012/0098875 A1 | 4/2012 | Shinkai et al. |
| 2012/0099040 A1 | 4/2012 | Robinson et al. |
| 2012/0120333 A1 | 5/2012 | Chen et al. |
| 2012/0133891 A1 | 5/2012 | Jiang |
| 2012/0147038 A1 | 6/2012 | Perez et al. |
| 2012/0194781 A1 | 8/2012 | Agurok |
| 2012/0212696 A1 | 8/2012 | Trajikovska et al. |
| 2012/0257131 A1 | 10/2012 | Galstian et al. |
| 2012/0300171 A1 | 11/2012 | Gupta et al. |
| 2013/0010256 A1 | 1/2013 | Haddock et al. |
| 2013/0027655 A1 | 1/2013 | Blum et al. |
| 2013/0128229 A1 | 5/2013 | Huang |
| 2013/0208224 A1 | 8/2013 | Kizu et al. |
| 2013/0215374 A1 | 8/2013 | Blum et al. |
| 2013/0250193 A1 | 9/2013 | Yun et al. |
| 2013/0250223 A1 | 9/2013 | Takagi et al. |
| 2014/0036172 A1 | 2/2014 | Trajkovska-Broach et al. |
| 2014/0036183 A1 | 2/2014 | Asatryan et al. |
| 2014/0118639 A1 | 5/2014 | Matsushima |
| 2014/0118644 A1 | 5/2014 | Liu et al. |
| 2014/0347405 A1 | 11/2014 | Kumeta |
| 2014/0375771 A1 | 12/2014 | Gabara |
| 2015/0116304 A1 | 4/2015 | Lee et al. |
| 2015/0185503 A1 | 7/2015 | Tate et al. |
| 2015/0219893 A1 | 8/2015 | Chen et al. |
| 2015/0378240 A1 | 12/2015 | Wang et al. |
| 2016/0004128 A1 | 1/2016 | Wu |
| 2016/0161767 A1 | 6/2016 | Childers |
| 2016/0209647 A1 | 7/2016 | Fursich |
| 2016/0313572 A1* | 10/2016 | Haddock ............... G02C 7/083 |
| 2016/0370605 A1 | 12/2016 | Ain-Kedem |
| 2017/0000330 A1 | 1/2017 | Samec et al. |
| 2017/0003519 A1 | 1/2017 | Burkert et al. |
| 2017/0068134 A1 | 3/2017 | Yadin et al. |
| 2017/0160518 A1 | 6/2017 | Lanman et al. |
| 2017/0184848 A1 | 6/2017 | Vallius |
| 2017/0219828 A1 | 8/2017 | Tsai et al. |
| 2017/0269453 A1 | 9/2017 | Galstian et al. |

(56) References Cited

U.S. PATENT DOCUMENTS

| | | | |
|---|---|---|---|
| 2017/0276963 | A1 | 9/2017 | Brennan et al. |
| 2017/0336638 | A1 | 11/2017 | Bos et al. |
| 2018/0136486 | A1 | 5/2018 | Macnamara et al. |
| 2018/0356652 | A1 | 12/2018 | Shibuya et al. |
| 2019/0113772 | A1 | 4/2019 | Yadin et al. |
| 2019/0155055 | A1* | 5/2019 | Lin .................. G02C 7/041 |
| 2020/0003933 | A1 | 1/2020 | Yadin et al. |
| 2020/0285062 | A1 | 9/2020 | Grutman et al. |
| 2020/0292848 | A1 | 9/2020 | Yadin et al. |
| 2021/0149197 | A1 | 5/2021 | Yadin et al. |
| 2021/0311356 | A1 | 10/2021 | Haddad et al. |
| 2021/0389591 | A1 | 12/2021 | Lee et al. |
| 2022/0214566 | A1 | 7/2022 | Alon et al. |

FOREIGN PATENT DOCUMENTS

| | | |
|---|---|---|
| CN | 102253563 A | 11/2011 |
| CN | 207380380 U | 5/2018 |
| CN | 108845433 A | 11/2018 |
| CN | 109799628 A | 5/2019 |
| EP | 0595705 A1 | 5/1994 |
| EP | 1050775 A1 | 11/2000 |
| EP | 1411382 A2 | 4/2004 |
| EP | 1760515 A2 | 3/2007 |
| EP | 2309310 A1 | 4/2011 |
| EP | 2503787 A1 | 9/2012 |
| EP | 2682810 A1 | 1/2014 |
| JP | S62209412 A | 9/1987 |
| JP | H0289017 A | 3/1990 |
| JP | H036518 A | 1/1991 |
| JP | 2003091013 A | 3/2003 |
| JP | 2010003340 A | 1/2010 |
| JP | 2011203457 A | 10/2011 |
| JP | 2012141552 A | 7/2012 |
| KR | 20030069204 A | 8/2003 |
| RU | 2541819 C2 | 2/2015 |
| WO | 8102795 A1 | 10/1981 |
| WO | 9941639 A1 | 8/1999 |
| WO | 03077012 A2 | 9/2003 |
| WO | 2006034652 A1 | 4/2006 |
| WO | 2007041796 A1 | 4/2007 |
| WO | 2008032061 A2 | 3/2008 |
| WO | 2011075834 A1 | 6/2011 |
| WO | 2012012826 A1 | 2/2012 |
| WO | 2012120470 A1 | 9/2012 |
| WO | 2014063432 A1 | 5/2014 |
| WO | 2017003330 A1 | 1/2017 |
| WO | 2017049072 A1 | 3/2017 |
| WO | 2017158486 A1 | 9/2017 |

OTHER PUBLICATIONS

Yadin et al., U.S. Appl. No. 17/521,880, filed Nov. 9, 2021.
Yadin et al., U.S. Appl. No. 17/521,887, filed Nov. 9, 2021.
EP Application # 21202537.3 Office Action dated Jan. 12, 2024.
CN Application # 2020800392942 Office Action dated Jan. 30, 2024.
US Application # U.S. Appl. No. 18/357,171 Office Action dated Feb. 15, 2024.
JP Application 2021568848 Office Action dated Mar. 5, 2024.
Sensomotoric Instruments Gmbh, "SMI Eye Tracking Glasses-Discover What is Seen", pp. 1-2, 2011.
Lensvector, "Breakthrough Autofocus Technology", 1 page, 2010.
Oktev et al., "Wave front control systems based on modal liquid crystal lenses", Review of Scientific Instruments, vol. 71, No. 9, pp. 3290-3297, Sep. 1, 2000.
Pixeloptics Inc., "The Evolution of Technology—emPower !—The world's First Electronic Focusing Eyewear", 1 page, 2009.
Brunosan., "Headaches in 3D", Saepe cadendo, pp. 1-4, Jan. 29, 2011.
Naumov et al., "Liquid-crystal adaptive lenses with modal control", Optics Letters, vol. 23, No. 13, pp. 992-994, Jul. 1, 1998.
Varioptic SA, "Liquid Lens for Auto Focus (AF)", pp. 1-3, Jul. 31, 2012.
Bagwell et al., "Liquid crystal based active optics", SPIE Proceedings Novel Optical Systems Design and Optimization IX, vol. 6289, pp. 1-12, Sep. 5, 2006.
Holoeye Photonics AG, "LC 2002: Translucent Spatial Light Modulator", pp. 1-2, May 12, 2012.
Varioptic SA, "The Liquid Lens Technology", pp. 1-2, Dec. 2, 2010.
Longtech Optics Co Ltd., "LCD Multiplex Ratio", 1 page, year 2008.
Stiefelhagen et al., "A Model-Based Gaze Tracking System", International Journal of Artificial Intelligence Tools, vol. 6, No. 2, pp. 193-209, year 1997.
Baluja et al., "Non-Intrusive Gaze Tracking Using Artificial Neural Networks", CMU Technical Report, CMU-CS-94-102; pp. 1-14, Jan. 5, 1994.
Jacob, R., "The Use of Eye Movements in Human-Computer Interaction Techniques: What You Look at Is What You Get", ACM Transactions on Information Systems, vol. 9, No. 3, pp. 152-169, Apr. 1991.
Heinzmann et al., "3-D Facial Pose And Gaze Point Estimation Using a Robust Real-Time Tracking Paradigm", Proceedings of the Third International Conference on Automatic Face and Gesture Recognition, pp. 142-147, Apr. 14-16, 1998.
Wang et al., "Liquid crystal blazed grating beam deflector", Part of the SPIE Conference on Advanced OpticalMemories and Interfaces to Comouter Storage, San Diego, USA, vol. 3468, pp. 43-54, Jul. 1998.
Goodman, "Introduction to Fourier Optics", 3rd edition, published by Roberts & Company, pp. 1-98, year 2005.
Boulder Nonlinear Systems, "Spatial Light Modulators—XY Phase Series", 1 p. 2007.
Boulder Nonlinear Systems, "Spatial Light Modulators—XY Phase Series—draft Specifications", 1 page, 2007.
Holmarc Opto-Mechantronics PVT. Ltd., "Lab Equipment for Research and Manufacturing", pp. 1-24 (relevant p. 18 "Bench Top Rubbing Machine"), Jan. 23, 2015.
EP Application # 18869416.0 Office Action dated May 26, 2023.
EP Application # 19841482.3 Search Report dated May 13, 2022.
U.S. Appl. No. 16/648,695 Office Action dated Jun. 9, 2022.
International Application # PCT/IB2022/052812 Search Report dated Jun. 30, 2022.
JP Application # 2021568848 Office Action dated Oct. 3, 2023.
U.S. Appl. No. 17/340,138 Office Action dated Feb. 24, 2023.
U.S. Appl. No. U.S. Appl. No. 17/521,887 Office Action dated Mar. 23, 2023.
EP Application # 20819033.0 Search Report May 17, 2023.
U.S. Appl. No. 18/322,647 Office Action dated May 8, 2024.
U.S. Appl. No. 18/548,932 Office Action dated May 20, 2024.
EP Application # 20199016.5 Office Action dated Jul. 19, 2024.
CN Application # 202080039294.2 Office Action dated Jun. 28, 2024.
U.S. Appl. No. 18/357,171 Office Action dated Sep. 5, 2024.
International Application # PCT/IB2024/055219 Search Report dated Sep. 26, 2024.
CN Application # 202080039294.2 Office Action dated Oct. 31, 2024.
U.S. Appl. No. 18/548,932 Office Action dated Nov. 22, 2024.

* cited by examiner

ELECTRICALLY-TUNABLE VISION AID FOR TREATMENT OF MYOPIA

CROSS-REFERENCE TO RELATED APPLICATION

This application is national phase of PCT Application PCT/IB2020/054524, filed May 13, 2020, which claims the benefit of U.S. Provisional Patent Application 62/856,065, filed Jun. 2, 2019. The disclosures of these related applications are incorporated herein by reference.

FIELD OF THE INVENTION

The present invention relates generally to optical devices, and particularly to electrically-tunable lenses and other vision aids.

BACKGROUND

Tunable lenses are optical elements whose optical characteristics, such as the focal length and/or the location of the optical axis, can be adjusted during use, typically under electronic control. Such lenses may be used in a wide variety of applications, including particularly serving as vision aids. For example, U.S. Pat. No. 7,475,985 describes the use of an electro-active lens for the purpose of vision correction. The term "vision aid," as used in the context of the present description and in the claims, refers to transparent optical elements that are positioned in front of the eye of a subject and have optical properties, which may be fixed and/or tunable, that are chosen so as to enhance the subject's vision.

Electrically-tunable lenses typically contain a thin layer of a suitable electro-optical material, i.e., a material whose local effective index of refraction changes as a function of the voltage applied across the material. An electrode or array of electrodes is used to apply the desired voltages in order to locally adjust the refractive index to the desired value. Liquid crystals are the electro-optical material that is most commonly used for this purpose (wherein the applied voltage rotates the molecules, which changes the axis of birefringence and thus changes the effective refractive index), but other materials, such as polymer gels, with similar electro-optical properties can alternatively be used for this purpose.

Some tunable lens designs use an electrode array to define a grid of pixels in the liquid crystal, similar to the sort of pixel grid used in liquid-crystal displays. The refractive indexes of the individual pixels may be electrically controlled to give a desired phase modulation profile. (The term "phase modulation profile" is used in the present description and in the claims to mean the distribution of the local phase shifts that are applied to light passing through the layer as the result of the locally-variable effective refractive index over the area of the electro-optical layer of the tunable lens.) Lenses using grid arrays of this sort are described, for example, in the above-mentioned U.S. Pat. No. 7,475,985.

PCT International Publication WO 2014/049577, whose disclosure is incorporated herein by reference, describes an optical device comprising an electro-optical layer, having an effective local index of refraction at any given location within an active area of the electro-optical layer that is determined by a voltage waveform applied across the electro-optical layer at the location. An array of excitation electrodes, including parallel conductive stripes extending over the active area, is disposed over one or both sides of the electro-optical layer. Control circuitry applies respective control voltage waveforms to the excitation electrodes and is configured to concurrently modify the respective control voltage waveforms applied to excitation electrodes so as to generate a specified phase modulation profile in the electro-optical layer.

Myopia (near-sightedness) is a condition in which the human eye over-focuses light, creating an image in front of the retina instead of on the retina. Consequently, the image perceived on the retina is blurred. U.S. Patent Application Publication 2012/0133891 describes an electro-optical apparatus and method for correcting myopia that includes at least one adaptive lens, a power source, and an eye tracker. The eye tracker includes an image sensor and a processor operatively connected to the adaptive lens and the image sensor. The processor is configured to receive electrical signals from the image sensor and to control the correction power of the adaptive lens to correct myopia, with the correction power dependent on a user's gaze distance and myopia prescription strength.

Several treatments have been studied for slowing down the progression of myopia (i.e., retarding the increase of the optical power required to enable sharp view of far distances). These methods are generally referred to as "myopia control." For example, U.S. Pat. No. 7,503,655 describes a method and apparatus for controlling optical aberrations to alter relative curvature of field by providing a predetermined corrective factor to produce at least one substantially corrective stimulus for repositioning peripheral, off-axis, focal points relative to the central, on-axis or axial focal point while maintaining the positioning of the central, on-axis or axial focal point on the retina. The invention is said to provide continuous, useful clear visual images while simultaneously retarding or abating the progression of myopia or hypermetropia.

SUMMARY

Embodiments of the present invention that are described hereinbelow provide improved methods and devices for vision correction, and particularly for treatment of myopia.

There is therefore provided, in accordance with an embodiment of the invention, apparatus for vision correction, including an electrically-tunable lens, which is configured to be mounted in proximity to an eye of a subject having a refractive error. Control circuitry is configured to apply drive signals to the electrically-tunable lens so as to generate in the electrically-tunable lens a first phase modulation profile in a central zone that intercepts a line of sight of the eye and a second phase modulation profile in a peripheral zone extending peripherally around the central zone over at least 180° of arc. The first phase modulation profile applies to light that is incident on the electrically-tunable lens a first refractive power of a first magnitude that is selected to correct the refractive error, and the second phase modulation profile applies to the light that is incident on the electrically-tunable lens a second refractive power of a second magnitude that is less than the first phase modulation profile.

In a disclosed embodiment, the refractive error is due to a myopia of the eye, and the first refractive power is a negative refractive power, with the first magnitude selected so as to correct the myopia.

In some embodiments, the apparatus includes an eye tracker, which is configured to detect an angle of the line of sight of the eye, wherein the control circuitry is configured to modify the drive signals so as to shift the central and peripheral zones responsively to changes in the angle of the line of sight. Additionally or alternatively, the control circuitry is configured to assess a distance from the electrically-tunable lens to an object viewed by the eye and to adjust the first refractive power responsively to the distance.

In some embodiments, the peripheral zone extends peripherally around the central zone over at least 270° of arc. In one such embodiment, the peripheral zone includes an annulus extending around the central zone over 360° of arc.

In a disclosed embodiment, the electrically-tunable lens is a compound lens including a fixed lens component having a predefined refractive power and a tunable component having a variable refractive power, which is controlled by the drive signals.

In one embodiment, the control circuitry is configured to apply the drive signals so that the second phase modulation profile varies continuously across the peripheral zone in a radial direction relative to the line of sight.

In other embodiments, the control circuitry is configured to apply the drive signals so that the second phase modulation profile includes a pattern of peaks and troughs that alternate across the peripheral zone in a transverse direction relative to the line of sight. In one such embodiment, the pattern is selected so that the second phase modulation profile emulates a Fresnel lens of the second refractive power. Alternatively, the pattern is selected so that the second phase modulation profile emulates an array of microlenses having the second refractive power.

In a disclosed embodiment, the electrically-tunable lens includes an electro-optical layer, having an effective local index of refraction at any given location within an active area of the electro-optical layer that is determined by a voltage waveform applied across the electro-optical layer at the location, and conductive electrodes extending over opposing first and second sides of the electro-optical layer, wherein the control circuitry is configured to apply the drive signals to the conductive electrodes.

There is also provided, in accordance with an embodiment of the invention, apparatus for vision correction, including an electrically-tunable optical phase modulator, which is configured to be mounted in proximity to an eye of a subject. Control circuitry is configured to apply drive signals to the optical phase modulator so as to generate in the optical phase modulator a first phase modulation profile in a central zone that intercepts a line of sight of the eye and a second phase modulation profile, different from the first phase modulation profile, in a peripheral zone extending peripherally around the central zone over at least 180° of arc. The first phase modulation profile is selected so as to enable clear vision by the eye in the central zone, while the second phase modulation profile is selected so as to blur light that is incident on the eye through the peripheral zone.

In some embodiments, the first phase modulation profile has a parabolic cross-section, while the second phase modulation profile has a non-parabolic cross-section. In a disclosed embodiment, the first phase modulation profile is selected so as to apply to light that is incident on the central zone of the optical phase modulator a refractive power selected so as to correct a refractive error of the eye.

Additionally or alternatively, the second phase modulation profile includes a pattern of peaks and troughs that alternate across the peripheral zone in a transverse direction relative to the line of sight.

In some embodiments, the apparatus includes an eye tracker, which is configured to detect an angle of the line of sight of the eye, wherein the control circuitry is configured to modify the drive signals so as to shift the central and peripheral zones responsively to changes in the angle of the line of sight.

There is additionally provided, in accordance with an embodiment of the invention, a method for vision correction, which includes providing an electrically-tunable lens for mounting in proximity to an eye of a subject having a refractive error. The electrically-tunable lens is driven so as to generate in the electrically-tunable lens a first phase modulation profile in a central zone that intercepts a line of sight of the eye and a second phase modulation profile in a peripheral zone extending peripherally around the central zone over at least 180° of arc. The first phase modulation profile applies to light that is incident on the electrically-tunable lens a first refractive power of a first magnitude that is selected to correct the refractive error, and the second phase modulation profile applies to the light that is incident on the electrically-tunable lens a second refractive power of a second magnitude that is less than the first phase modulation profile.

There is further provided, in accordance with an embodiment of the invention, a method for vision correction, which includes providing an electrically-tunable optical phase modulator for mounting in proximity to an eye of a subject. The optical phase modulator is driven so as to generate in the optical phase modulator a first phase modulation profile in a central zone that intercepts a line of sight of the eye and a second phase modulation profile, different from the first phase modulation profile, in a peripheral zone extending peripherally around the central zone over at least 180° of arc, such that the first phase modulation profile enables clear vision by the eye in the central zone, while the second phase modulation profile blurs light that is incident on the eye through the peripheral zone.

The present invention will be more fully understood from the following detailed description of the embodiments thereof, taken together with the drawings in which:

DETAILED DESCRIPTION OF EMBODIMENTS

Overview

Research has shown that applying myopic defocus for peripheral vision can slow the progression of myopia. It is hypothesized that hyperopic defocus in the peripheral vision (meaning that the image is focused behind the retina) triggers the growth of the eye, resulting in progression of myopia. This phenomenon can be mitigated by applying myopic defocus (image formed in front of the retina) in the peripheral part of the field of vision. For example, in myopia control spectacles, the center of the lens may have the user's nominal myopia prescription, while the periphery of the lens is designed to provide a myopic defocus.

One of the challenges of applying this sort of myopic defocus, however, is that the eye rotates, and therefore different areas of the spectacle lenses are used for peripheral vision at different points in time. When the eye rotates, the line of sight crosses the area of the defocus, and therefore the center vision is perturbed, while some of the peripheral vision is not. To avoid this phenomenon, the user is forced to turn his or her head in order to reduce eye rotation.

Embodiments of the present invention provide an electrically-controlled spectacle lens for myopia control, in which peripheral vision defocus is applied without degrading the sharpness of the center vision. These embodiments use an electrically-tunable optical phase modulator, which can be mounted in proximity to the subject's eye, for example as spectacle lenses. Control circuitry, applies drive signals to the optical phase modulator so as to generate a first phase modulation profile in a central zone that intercepts the line of sight of the eye, and a different, second phase modulation profile in a peripheral zone extending peripherally around the central zone. The first phase modulation profile is selected so as to enable clear vision by the eye in the central zone, while the second phase modulation profile is selected so as to blur light that is incident on the eye through the peripheral zone (i.e., to blur the image that is incident on the peripheral area of the retina of the eye).

In some of the embodiments that are described below, the optical phase modulator is configured as an electrically-tunable lens. This lens may be a compound lens, including a fixed lens, made from glass or plastic, for example, to provide a baseline refractive power, which is modified dynamically by one or more electrically-tunable lens elements. The control circuitry applies drive signals to the electrically-tunable lens so as to generate a phase modulation profile in the central zone of the lens, which intercepts the line of sight of the eye, with a refractive power selected to correct the subject's refractive error. At the same time, in a peripheral zone extending peripherally around the central zone, the drive signals in these embodiments cause the electrically-tunable lens to generate a phase modulation profile with a refractive power having a lower magnitude than that in the central zone.

The term "magnitude," in the context of the present description and in the claims, refers to absolute magnitude, and the sign of the refractive power may be either negative or positive. For myopia control, the refractive power in the central zone is negative, while that in the peripheral zone is less negative or may even be slightly positive. The peripheral zone typically extends peripherally around the central zone over at least 180° of arc, but it may extend around at least 270° of arc, or even over an entire annulus of 360°.

Alternatively, other phase modulation profiles, magnitudes and signs of refractive power may be chosen in order to treat ophthalmic disorders of other types, and the optical phase modulator is not necessarily configured as a lens for correcting the refractive error of the eye. In some of these embodiments, the phase modulation profile in the central zone of the optical phase modulator has a parabolic cross-section, which may be a flat cross-section, i.e., a parabola with its focus at infinity. (Profiles of this sort are shown in FIGS. 3B, 3C, 4B and 5B, for example.) The phase modulation profile in the peripheral zone may be non-parabolic.

The use of an electrically-tunable optical phase modulator is advantageous in its ability to generate a wide range of different phase modulation profiles, with different patterns of spatial variation across the peripheral zone relative to the line of sight. The phase modulation profile may vary continuously over the peripheral zone, or it may comprise a pattern of alternating peaks and troughs, which may be chosen so as to emulate a Fresnel lens or an array of microlenses, for example. Furthermore, when an eye tracker is used to detect the angle of the line of sight of the eye, the control circuitry can modify the drive signals so as to shift the central and peripheral zones in response to changes in the angle of the line of sight. Thus, when the eye moves, the central zone will remain roughly centered on the line of sight, and the blurring applied by the peripheral zone will affect only the peripheral vision.

Embodiments of the present invention thus enable ophthalmic treatments to be tailored to the particular needs of each patient, for enhanced patient comfort and therapeutic effect. Since the phase modulation profiles can be changed simply by reprogramming the control circuitry, the characteristics of the electrically-tunable lens or other optical phase modulator can be updated as treatment progresses. Researchers can also use these reprogramming capabilities to evaluate the therapeutic impact of different phase modulation profiles.

System Description

Figure 1:
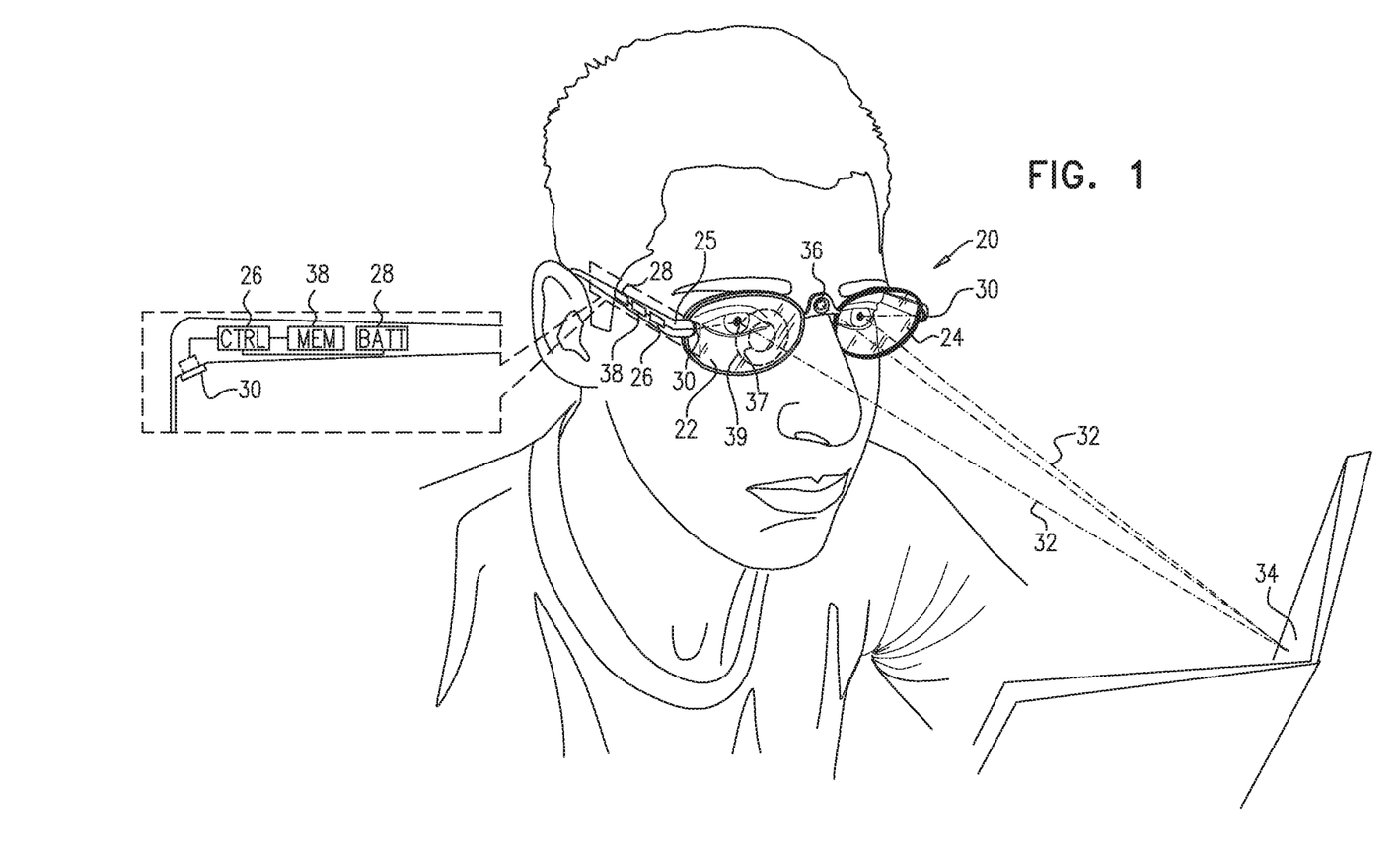
FIG. 1 is a schematic, pictorial illustration of adaptive spectacles, in accordance with an embodiment of the invention.

FIG. 1 is a schematic, pictorial illustration of adaptive spectacles 20, in accordance with an embodiment of the invention. Spectacles 20 comprise electrically-tunable lenses 22 and 24, mounted in a frame 25. The optical properties of the lenses, including the refractive power (including both central and peripheral zones of the lenses), and optical center (or equivalently, the optical axis) are controlled by control circuitry 26, which is powered by a battery 28 or other power source. Control circuitry 26 typically comprises an embedded microprocessor with hard-wired and/or programmable logic components and suitable interfaces for carrying out the functions that are described herein. These and other elements of spectacles 20 are typically mounted on or in frame 25, or may alternatively be contained in a separate unit (not shown) connected by wire to frame 25.

Spectacles 20 comprise one or more sensors, which sense the direction of the line of sight of the eyes of the person wearing the spectacles, and possible also the distance from the eyes to an object 34 viewed by the person. Control circuitry 26 tunes lenses 22 and 24 according to the sensor readings. In the pictured example, the sensors include a pair of eye trackers 30, which detect respective lines of sight 32 (gaze directions) of the right and left eyes. Control circuitry 26 typically shifts the respective optical axes of lenses responsively to the sensed gaze directions. Furthermore, the control circuitry can use the distance between the pupils, as measured by eye trackers 30, to estimate the user's focal distance (even without analyzing the actual gaze direction), and possibly to identify the distance from the eye to object 34.

On this basis, control circuitry 26 can adjust the refractive power of lenses 22 and 24 so as to assist the user's eyes in distance accommodation, and thus reduce or eliminate the user's need to accommodate, for example, as described in PCT International Publication WO 2019/012385, whose disclosure is incorporated herein by reference. Control circuitry 26 assesses the distance from the lenses to object 34 and adjusts the refractive power in at least a central zone 37 of the lenses based on the distance. Specifically, for a myopic eye with a negative refractive correction of a certain magnitude for distant vision, control circuitry 26 can reduce the magnitude of the correction when the user is viewing a nearby object.

Additionally or alternatively, a camera 36 captures an image of object 34, for use by control circuitry 26 in identifying the object and setting the focal distance. Either eye trackers 30 or camera 36 may be used in determining the focal distance, but both of these sensors can be used together to give a more reliable identification of the object. Alternatively or additionally, camera 36 may be replaced or supplemented by a rangefinder or other proximity sensor, which measures the distance to object 34.

Control circuitry 26 applies drive signals to lenses 22 and 24 according to phase modulation profile parameters that are stored in a memory 38. In the case of myopia control, for example, these parameters indicate the characteristics that are to be applied in both central zone 37 and a peripheral zone 39 of the lenses. (In the pictured example, zone 39 is annular, extending 360° around zone 37, but alternatively zone 39 may extend around a smaller angle of arc, as explained above.) As noted earlier, the phase modulation profile of central zone 37 in each lens 22, 24 is typically selected so that the refractive power of the central zone has a magnitude that corrects the refractive error of the respective eye. The parameters for peripheral zones 39 are selected so that the magnitudes of the refractive power in these zones are less than in the corresponding central zones. The reduced magnitudes are chosen so that the peripheral zones have a therapeutic effect on the eyes, for example in retarding the progression of myopia. As noted above, control circuitry 26 shifts the locations of zones 37 and 39 in response to changes in the angles of lines of sight 32.

Figure 2:
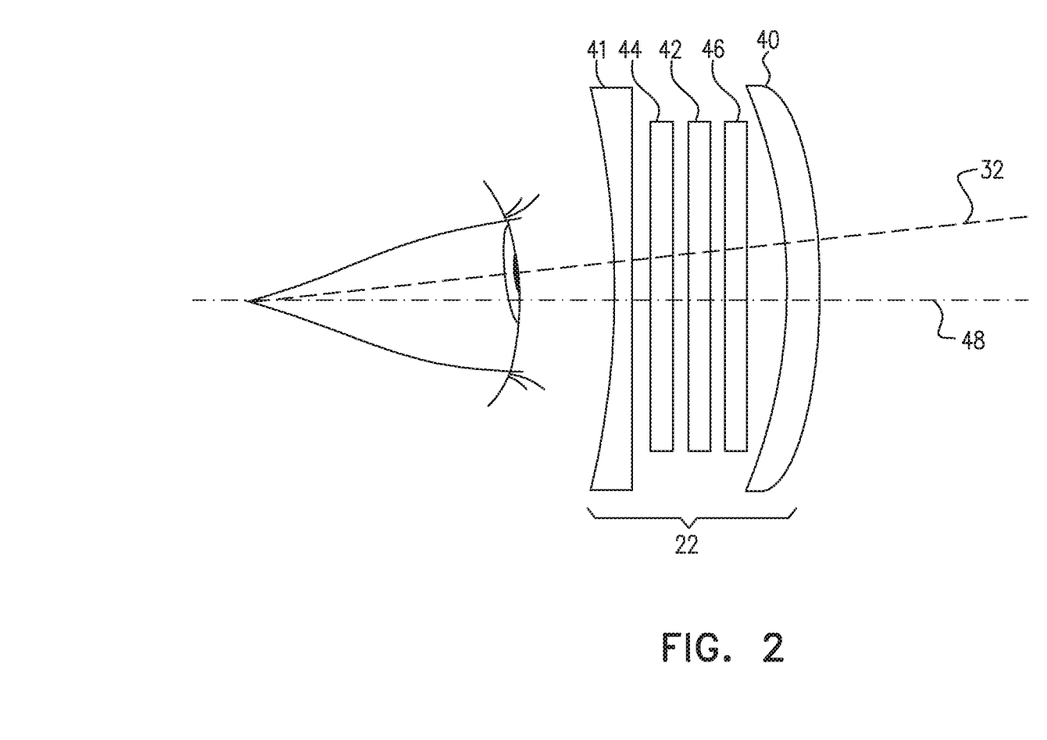
FIG. 2 is a schematic side view of an electrically-tunable lens system, in accordance with an embodiment of the invention.

FIG. 2 is a schematic side view of electrically-tunable lens 22, in accordance with an embodiment of the invention. Lens 24 is typically of similar design.

In the pictured embodiment, lens 22 is a compound lens, which comprises multiple elements: Fixed lenses 40 and 41, typically made from glass or plastic, provide a baseline refractive power, which is modified dynamically by two electrically-tunable phase modulators 42 and 44. Such phase modulators can be used to implement various phase modulation profiles, such as a spherical lens, a cropped lens, lens arrays, an aspherical lens, or combinations of these profiles in different areas on the panel. Furthermore, the phase modulators can switch dynamically between different phase profile implementations.

Although fixed lenses 40 and 41 are shown as being physically separate from tunable phase modulators 42 and 44, in practice these components are typically encapsulated in a single package, in the form of a spectacle lens. (For this reason, lens 22 itself can be considered an electrically-tunable lens.) Thus, the total refractive power of lens 22, over any zone within the area of the lens 22, will typically be a sum of the fixed refractive powers of lenses 40 and 41 with the variable refractive power (or other phase modulation profile) applied by phase modulators 42 and 44. Alternatively, lens 22 may comprise only electrically-tunable elements, and fixed lenses 40 and 41 may not be needed, particularly when the magnitude of the refractive correction is small. In some embodiments, lens 22 also comprises a polarizing element 46, such as a polarizer and/or polarization rotator, with functionality as described hereinbelow.

Electrically-tunable phase modulators 42 and 44 adjust the phase modulation profile of lens 22 depending on the angle of the user's line of sight and possibly the distance to the object being viewed by the user, with central and peripheral zones 37 and 39 of lens 22 defined as described above. On this basis, an optical axis 48 of phase modulators 42 and 44 is shifted in response to changes in gaze direction 32. Phase modulators 42 and 44 may comprise one-dimensional phase modulators (phase modulators for which the phase modulation profile is a function of the position in one axis), positioned such that they operate on orthogonal axes, for example electrically-tunable cylindrical lenses, with orthogonal cylinder axes. Alternatively, phase modulators 42 and 44 may be configured to generate two-dimensional phase modulation profiles and thus emulate spherical or aspheric lenses (or their Fresnel equivalents). Both of these sorts of lens configurations, as well as waveforms for driving the lenses, are described in detail in the above-mentioned WO 2014/049577.

As shown in FIGS. 2A-C and 3A-D of WO 2014/049577 and explained with reference thereto, modulators 42 and 44 in the present embodiments comprise an electro-optical layer, such as a layer of liquid crystal, and conductive electrodes extending over opposing first and second sides of the electro-optical layer. The electro-optical layer has an effective local index of refraction at any given location within its active area that is determined by a voltage waveform applied across the electro-optical layer between the electrodes at that location. Control circuitry 26 applies drive signals with the appropriate voltage waveforms to the electrodes, in accordance with the refractive and therapeutic phase modulation profile parameters in memory 38.

In some embodiments in which phase modulators 42 and 44 comprise respective polarization-dependent electro-optical layers, the electro-optical layers are oriented so as to refract mutually-orthogonal polarizations: One of these phase modulators, for example, modulator 42, operates on light polarized in the X-direction (pointing into the page in the view shown in FIG. 2), and does not influence light polarized in the Y-direction (pointing upward in this view). Phase modulator 44 operates on light polarized in the Y-direction and does not influence light polarized in the X-direction. Unpolarized light passing through phase modulators 42 and 44 will thus be focused at both distances, with roughly half the light focused by phase modulator 42, while the other half is focused by phase modulator 44. Alternatively, polarizing element 46 may comprise a polarization rotator, which intercepts the incoming light and rotates its polarization so as to ensure that the light incident on the electro-optical layers of phase modulators 42 and 44 has a component at each of the respective polarizations.

In an alternative embodiment (not shown in the figures), an electrically-tunable lens comprises four optical phase modulators, combining the features of the embodiments described above: two one-dimensional phase modulators modulating light as a function of X position (for example emulating cylindrical lenses with cylinder axes parallel to the X-axis), operating on X-polarized and Y-polarized light, respectively; and two one-dimensional phase modulators modulating light as a function of Y position (for example emulating cylindrical lenses with cylinder axes parallel to the Y-axis), operating on X-polarized and Y-polarized light, respectively. This electronically-tunable lens is thus capable of applying two-dimensional refractive profiles to light of all polarizations. Alternatively, other combinations of electrode orientations and electro-optical layer polarizations may be used, depending on application requirements. All such combinations are considered to be within the scope of the present invention.

Tunable Lens Profiles for Myopia Control

The figures that follow show optical profiles of refractive power and phase shift of electrically-tunable phase modulators 42 and 44 as a function of location along a line running across the lens, for example along the horizontal (X) axis, crossing central and peripheral zones 37 and 39. These profiles may be applied by each of phase modulators 42 and 44 individually (assuming the lenses are capable of generating two-dimensional profiles) or by the two phase modulators 42 and 44 in combination, for example along orthogonal cylinder axes. Alternatively, similar sorts of profiles may be generated in electrically-tunable lenses of other sorts.

Central zone 37 is assumed in these examples to have a diameter of 4 mm, although larger or smaller diameters may be used. For example, control circuitry 26 may increase or decrease the size of central zone 37 as a function of pupil size, as measured by eye trackers 30.

Figure 3A:
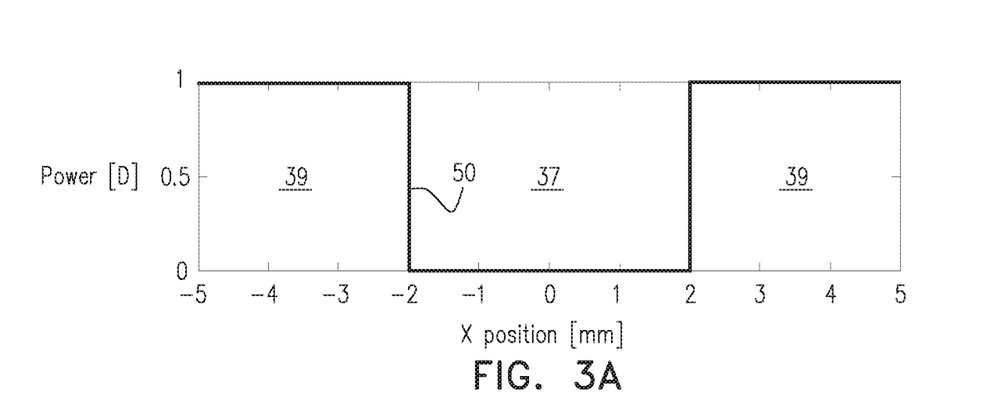
FIG. 3A is a schematic plot of the refractive power of an electrically-tunable lens as a function of location across the lens, in accordance with an embodiment of the invention.

FIG. 3A is a schematic plot 50 of the refractive power (in diopters) of electrically-tunable phase modulators 42 and 44 as a function of location across the lenses, in accordance with an embodiment of the invention. In this example, it is assumed that fixed lenses 40 and 41 provide a baseline refractive power equal to the refractive correction required by the user, for instance −2D (two diopters, with negative sign). Therefore, control circuitry 26 drives phase modulators 42 and 44 to apply no additional refractive power in central zone 37. In peripheral zone 39, phase modulators 42 and 44 apply an additional refractive power of +1D, so that the net refractive power of lens 22 is −1D. The reduced magnitude of the refractive power in the peripheral zone can be useful in myopia control.

Figure 3B:
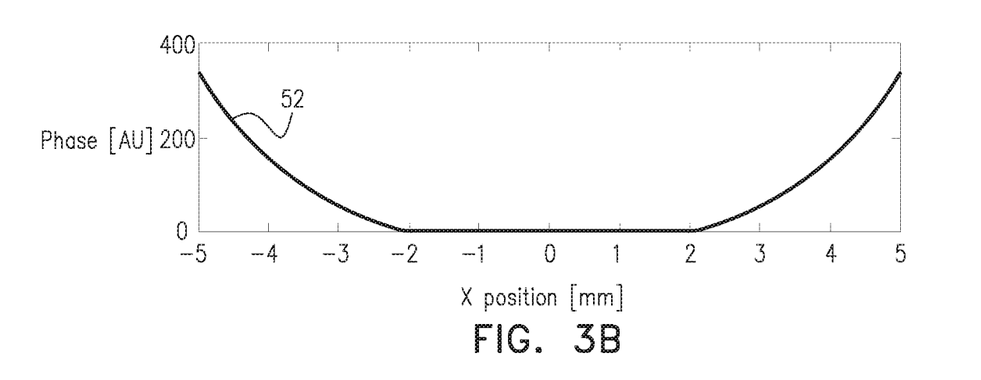
FIG. 3B is a schematic plot of a phase modulation profile applied by the electrically-tunable lens of FIG. 3A as a function of location across the lens, in accordance with an embodiment of the invention.

FIG. 3B is a schematic plot 52 of the phase modulation profile applied by phase modulators 42 and 44 (in arbitrary units of phase, AU) as a function of location across the lenses, in accordance with an embodiment of the invention. In this case, the phase modulation profile represented by plot 52 varies continuously across the peripheral zone in the radial direction relative to the line of sight, which is located at the origin X=0.

Figure 3C:
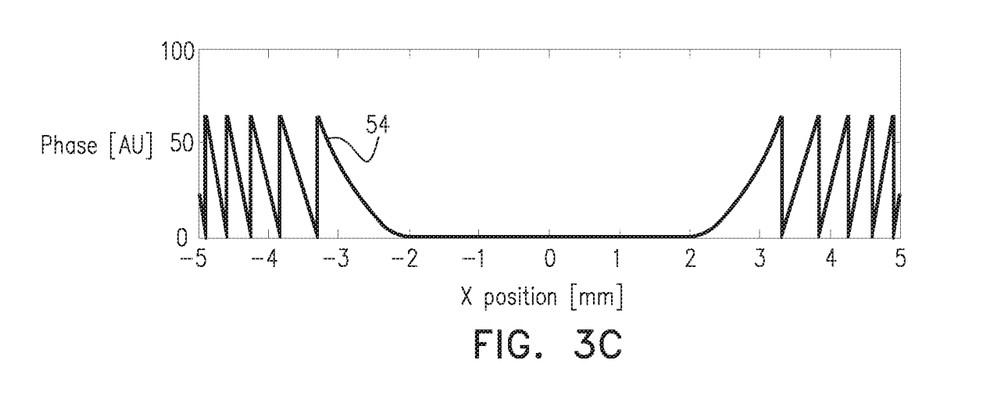
FIG. 3C is a schematic plot of a phase modulation profile applied by an electrically-tunable lens as a function of location across the lens, in accordance with another embodiment of the invention.

FIG. 3C is a schematic plot 54 of the phase modulation profile applied by phase modulators 42 and 44 as a function of location across the lenses, in accordance with another embodiment of the invention. The phase modulation profile in this case comprises a pattern of peaks and troughs that alternate across peripheral zone 39 in a transverse direction relative to the line of site (corresponding to the radial direction when the profile is circularly symmetric). The pattern is selected so that the phase modulation profile emulates a Fresnel lens. The Fresnel lens achieves the same refractive power (+1D) as does the smooth profile of plot 52, but with a lower maximum phase shift. The use of the Fresnel profile, as opposed to a smooth profile, thus makes it possible to use thinner electro-optical layers in lenses 42 and 44, as well as lower voltages in driving the lenses.

Figure 4A:
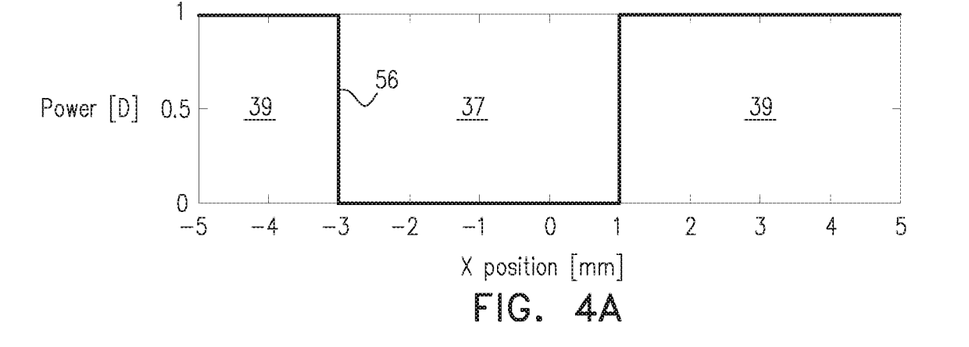
FIG. 4A is a schematic plot of the refractive power of the electrically-tunable lens of FIG. 3A as a function of location across the lens, showing a lateral shift in the refractive power in response to movement of the eye of a user of the lens, in accordance with an embodiment of the invention.

FIG. 4A is a schematic plot 56 of the refractive power of phase modulators 42 and 44 as a function of location across the lenses, showing a shift in the refractive power in response to movement of the eye of a user of lens 22, in accordance with an embodiment of the invention. In this example, eye tracker 30 has detected that the point of intersection of line of sight 32 with phase modulators 42 and 44 has shifted by 1 mm. Control circuitry 26 accordingly modifies the drive signals applied to the lenses so that central zone 37 shifts to be centered on the new line of sight.

Figure 4B:
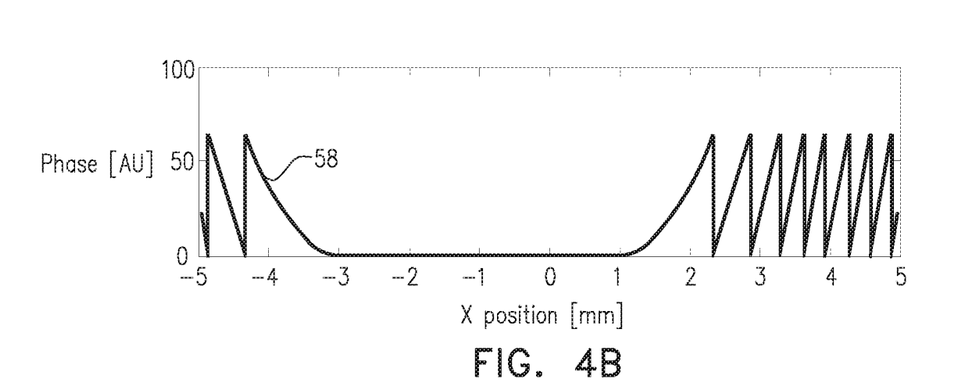
FIG. 4B is a schematic plot of a phase modulation profile applied by the electrically-tunable lens of FIG. 4A as a function of location across the lens, in accordance with an embodiment of the invention.

FIG. 4B is a schematic plot 58 of the phase modulation profile applied by phase modulators 42 and 44 as a function of location across the lenses, in accordance with an embodiment of the invention. In this example, phase modulators 42 and 44 apply a Fresnel phase modulation profile (as in FIG. 3C), with the center of the profile shifted to provide the desired shift in the location of central zone 37.

Figure 5A:
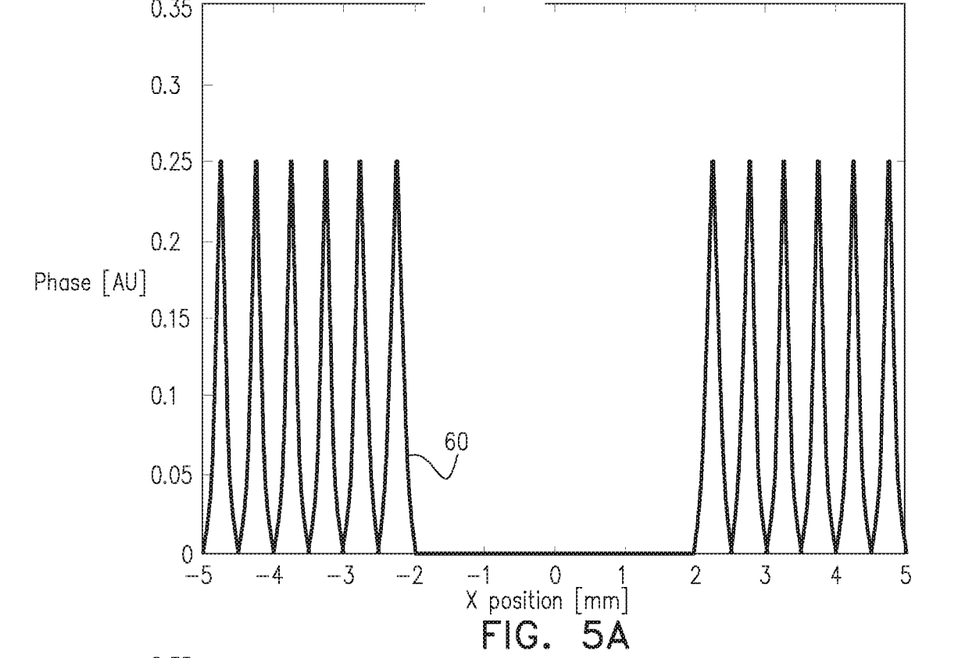
FIG. 5A is a schematic plot of a phase modulation profile applied by an electrically-tunable lens as a function of location across the lens, in accordance with another embodiment of the invention.
Figure 5B:
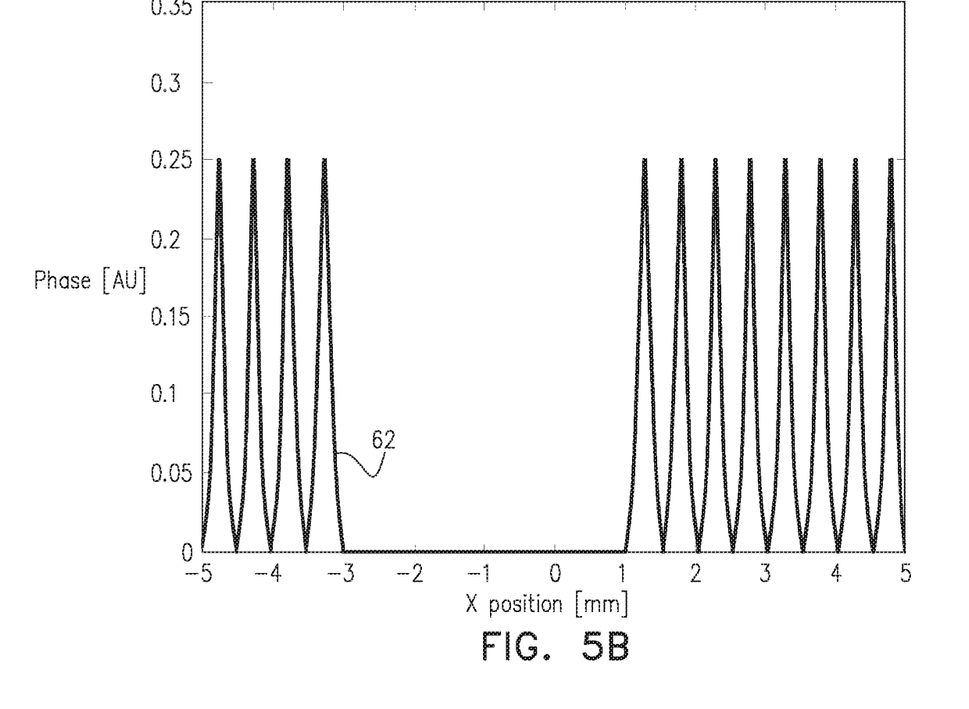
FIG. 5B is a schematic plot of the phase modulation profile applied by the electrically-tunable lens of FIG. 5A as a function of location across the lens, showing a shift in the phase modulation profile in response to movement of the eye of a user of the lens, in accordance with an embodiment of the invention.

FIGS. 5A and 5B are schematic plots 60 and 62 of phase modulation profiles applied by phase modulators 42 and 44 as a function of location across the lenses, in accordance with another embodiment of the invention. Here, too, the phase shift is plotted in arbitrary units. The phase modulation profiles of plots 60 and 62 comprise patterns of alternating peaks and troughs that emulate an array of microlenses in peripheral zone 39. Plot 62 shows the shift in the phase modulation profile in response to movement of the eye of the user.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Apparatus for vision correction, comprising:
  an electrically-tunable lens, which is configured to be mounted in proximity to an eye of a subject having a refractive error; and
  control circuitry, which is configured to apply drive signals to the electrically-tunable lens so as to generate in the electrically-tunable lens a first phase modulation profile in a central zone that intercepts a line of sight of the eye and a second phase modulation profile in a peripheral zone extending peripherally around the central zone over at least 180° of arc, such that the first phase modulation profile is flat and applies to light that is incident on the electrically-tunable lens no refractive power, and the second phase modulation profile applies to the light that is incident on the electrically-tunable lens a non-zero refractive power,
  wherein the control circuitry is configured to apply the drive signals so that the second phase modulation profile comprises a pattern of peaks and troughs that alternate across the peripheral zone in a transverse direction relative to the line of sight so as to emulate an array of microlenses.

2. The apparatus according to claim 1, and comprising an eye tracker, which is configured to detect an angle of the line of sight of the eye, wherein the control circuitry is configured to modify the drive signals so as to shift the central and peripheral zones responsively to changes in the angle of the line of sight.

3. The apparatus according to claim 1, wherein the peripheral zone extends peripherally around the central zone over at least 270° of arc.

4. The apparatus according to claim 3, wherein the peripheral zone comprises an annulus extending around the central zone over 360° of arc.

5. The apparatus according to claim 1, and comprising a fixed lens component having a predefined refractive power, to define a compound lens together with the electronically-tunable lens.

6. The apparatus according to claim 1, wherein the control circuitry is configured to apply the drive signals so that the second phase modulation profile varies continuously across the peripheral zone in a radial direction relative to the line of sight.

7. The apparatus according to claim 1, wherein the electrically-tunable lens comprises:
an electro-optical layer, having an effective local index of refraction at any given location within an active area of the electro-optical layer that is determined by a voltage waveform applied across the electro-optical layer at the location; and
conductive electrodes extending over opposing first and second sides of the electro-optical layer,
wherein the control circuitry is configured to apply the drive signals to the conductive electrodes.

8. Apparatus for vision correction, comprising:
an electrically-tunable optical phase modulator, which is configured to be mounted in proximity to an eye of a subject; and
control circuitry, which is configured to apply drive signals to the optical phase modulator so as to generate in the optical phase modulator a first phase modulation profile in a central zone that intercepts a line of sight of the eye and a second phase modulation profile, different from the first phase modulation profile, in a peripheral zone extending peripherally around the central zone over at least 180° of arc, such that the first phase modulation profile is flat and applies no refractive power to light that is incident on the optical phase modulator so as to enable clear vision by the eye in the central zone, while the second phase modulation profile is selected so as to blur light that is incident on the eye through the peripheral zone,
wherein the control circuitry is configured to apply the drive signals so that the second phase modulation profile comprises a pattern of peaks and troughs that alternate across the peripheral zone in a transverse direction relative to the line of sight so as to emulate an array of microlenses.

9. The apparatus according to claim 8, and comprising an eye tracker, which is configured to detect an angle of the line of sight of the eye, wherein the control circuitry is configured to modify the drive signals so as to shift the central and peripheral zones responsively to changes in the angle of the line of sight.

10. The apparatus according to claim 8, wherein the peripheral zone extends peripherally around the central zone over at least 270° of arc.

11. The apparatus according to claim 10, wherein the peripheral zone comprises an annulus extending around the central zone over 360° of arc.

12. A method for vision correction, comprising:
providing an electrically-tunable lens for mounting in proximity to an eye of a subject having a refractive error; and
driving the electrically-tunable lens so as to generate in the electrically-tunable lens a first phase modulation profile in a central zone that intercepts a line of sight of the eye and a second phase modulation profile in a peripheral zone extending peripherally around the central zone over at least 180° of arc, such that the first phase modulation profile is flat and applies to light that is incident on the electrically-tunable lens no refractive power, and the second phase modulation profile applies to the light that is incident on the electrically-tunable lens a non-zero refractive power,
wherein driving the electrically-tunable lens comprises applying drive signals to the electrically-tunable lens so that the second phase modulation profile comprises a pattern of peaks and troughs that alternate across the peripheral zone in a transverse direction relative to the line of sight so as to emulate an array of microlenses.

13. The method according to claim 12, and comprising detecting an angle of the line of sight of the eye, wherein driving the electrically-tunable lens comprises shifting the central and peripheral zones responsively to changes in the angle of the line of sight.

14. The method according to claim 12, wherein the peripheral zone extends peripherally around the central zone over at least 270° of arc.

15. The method according to claim 14, wherein the peripheral zone comprises an annulus extending around the central zone over 360° of arc.

16. The method according to claim 12, wherein providing the electrically-tunable lens comprises providing a compound lens comprising a fixed lens component having a predefined refractive power together with the electrically-tunable lens, which is driven to generate the first and second phase modulation profiles.

17. The method according to claim 12, wherein driving the electrically-tunable lens comprises applying drive signals to the electrically-tunable lens so that the second phase modulation profile varies continuously across the peripheral zone in a radial direction relative to the line of sight.

18. The method according to claim 12, wherein the electrically-tunable lens comprises:
an electro-optical layer, having an effective local index of refraction at any given location within an active area of the electro-optical layer that is determined by a voltage waveform applied across the electro-optical layer at the location; and
conductive electrodes extending over opposing first and second sides of the electro-optical layer,
wherein driving the electrically-tunable lens comprises applying drive signals to the conductive electrodes.

19. A method for vision correction, comprising:
providing an electrically-tunable optical phase modulator for mounting in proximity to an eye of a subject; and
driving the optical phase modulator so as to generate in the optical phase modulator a first phase modulation profile in a central zone that intercepts a line of sight of the eye and a second phase modulation profile, different from the first phase modulation profile, in a peripheral zone extending peripherally around the central zone over at least 180° of arc, such that the first phase modulation profile is flat and applies no refractive power to light that is incident on the optical phase modulator so as to enable clear vision by the eye in the central zone, while the second phase modulation profile blurs light that is incident on the eye through the peripheral zone, wherein driving the optical phase modulator comprises applying drive signals to the electrically-tunable lens so that the second phase modulation profile comprises a pattern of peaks and troughs that alternate across the peripheral zone in a transverse direction relative to the line of sight so as to emulate an array of microlenses.

20. The method according to claim 19, and comprising detecting an angle of the line of sight of the eye, wherein driving the optical phase modulator comprises shifting the central and peripheral zones responsively to changes in the angle of the line of sight.

21. The method according to claim 19, wherein the peripheral zone extends peripherally around the central zone over at least 270° of arc.

22. The method according to claim 21, wherein the peripheral zone comprises an annulus extending around the central zone over 360° of arc.

23. The apparatus according to claim 5, wherein the predefined refractive power of the fixed lens component is selected to correct the refractive error.

24. The apparatus according to claim 23, wherein the predefined refractive power of the fixed lens component is negative, and wherein the non-zero refractive power of the second phase modulation profile is positive.

25. The apparatus according to claim 8, and comprising a fixed lens component having a predefined refractive power, to define a compound lens together with the electrically-tunable optical phase modulator.

26. The method according to claim 16, wherein the predefined refractive power of the fixed lens component is selected to correct the refractive error.

27. The method according to claim 26, wherein the predefined refractive power of the fixed lens component is negative, and wherein the non-zero refractive power of the second phase modulation profile is positive.

\* \* \* \* \*